(12) United States Patent
Mekad et al.

(10) Patent No.: US 10,110,513 B2
(45) Date of Patent: Oct. 23, 2018

(54) MULTI-CHASSIS SWITCH HAVING A MODULAR CENTER STAGE CHASSIS

(71) Applicant: Juniper Networks, Inc., Sunnyvale, CA (US)

(72) Inventors: Sunil Mekad, Bangalore (IN); Satish D. Deo, Cupertino, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 15/656,545

(22) Filed: Jul. 21, 2017

(65) Prior Publication Data

US 2017/0324679 A1 Nov. 9, 2017

Related U.S. Application Data

(63) Continuation of application No. 14/561,081, filed on Dec. 4, 2014, now Pat. No. 9,716,669.

(51) Int. Cl.
*H04L 12/933* (2013.01)
*H04L 12/947* (2013.01)
*H04L 12/931* (2013.01)

(52) U.S. Cl.
CPC ........ *H04L 49/101* (2013.01); *H04L 49/1515* (2013.01); *H04L 49/25* (2013.01); *H04L 49/45* (2013.01)

(58) Field of Classification Search
CPC ....... H04L 49/101; H04L 49/25; H04L 49/70; H04L 45/245; H04L 45/28; H04L 45/58
See application file for complete search history.

(56) References Cited

U.S. PATENT DOCUMENTS 6,807,172 B1* 10/2004 Levenson ........... H04L 49/3009
370/389
7,099,355 B1 8/2006 Johnson et al.
(Continued)

FOREIGN PATENT DOCUMENTS

CN 1338168 2/2002
CN 103297357 1/2003
(Continued)

OTHER PUBLICATIONS

Extended European Search Report corresponding to EP 15197606.5, dated Apr. 14, 2016, 7 pages.
(Continued)

*Primary Examiner* — Jamal Javaid
(74) *Attorney, Agent, or Firm* — Harrity & Harrity, LLP

(57) ABSTRACT

A system may comprise a first group of switches, each switch including a first group of inputs and outputs, and a first group of controllers, each controller being independent from one another and corresponding to a switch of the first group of switches, to selectively control the switch to connect the switch's inputs with outputs. The first group of switches and controllers may be installed in a chassis. The system may comprise a second group of switches, each switch including a second group of inputs and outputs, and a second group of controllers, each controller corresponding to a switch of the second group of switches, to selectively control the switch to connect the switch's inputs with outputs. The second group of controllers may control and connect, via a group of control links, to the first group of controllers.

20 Claims, 12 Drawing Sheets

(56) References Cited

U.S. PATENT DOCUMENTS

| | | | |
|---|---|---|---|
| 8,554,949 B2 | 10/2013 | Goodill et al. | |
| 9,237,096 B2 | 1/2016 | Tamura et al. | |
| 9,716,669 B2 | 7/2017 | Mekad et al. | |
| 2002/0196814 A1 | 12/2002 | Mouton et al. | |
| 2014/0075085 A1* | 3/2014 | Schroder | G06F 13/4022 710/317 |
| 2015/0288583 A1* | 10/2015 | Le | H04L 43/08 370/252 |

FOREIGN PATENT DOCUMENTS

| | | |
|---|---|---|
| CN | 101421989 | 4/2009 |
| CN | 1394062 | 9/2013 |
| WO | WO 2014/037916 A2 | 3/2014 |

OTHER PUBLICATIONS

Blau et al., "AXD 301: A new generation ATM switching system", Computer Networks 31, 1999, pp. 559-582.

Rathgeb et al., "The MainStreetXpress Core Services Node—A Versatile ATM Switch Architecture for the Full Service Network", IEEE Journal on Selected areas in Communications, vol. 15, No. 5, Jun. 1997, pp. 795-806.

Cisco, "Cisco CRS Carrier Routing System Multishelf System Description", www.cisco.com, Jul. 2014, 90 pages.

Juniper Networks, "Understanding MX Fabric", http://kb.juniper.net/InfoCenter/index?page=content&id=KB23065, Sep. 27, 2012, 3 pages.

* cited by examiner

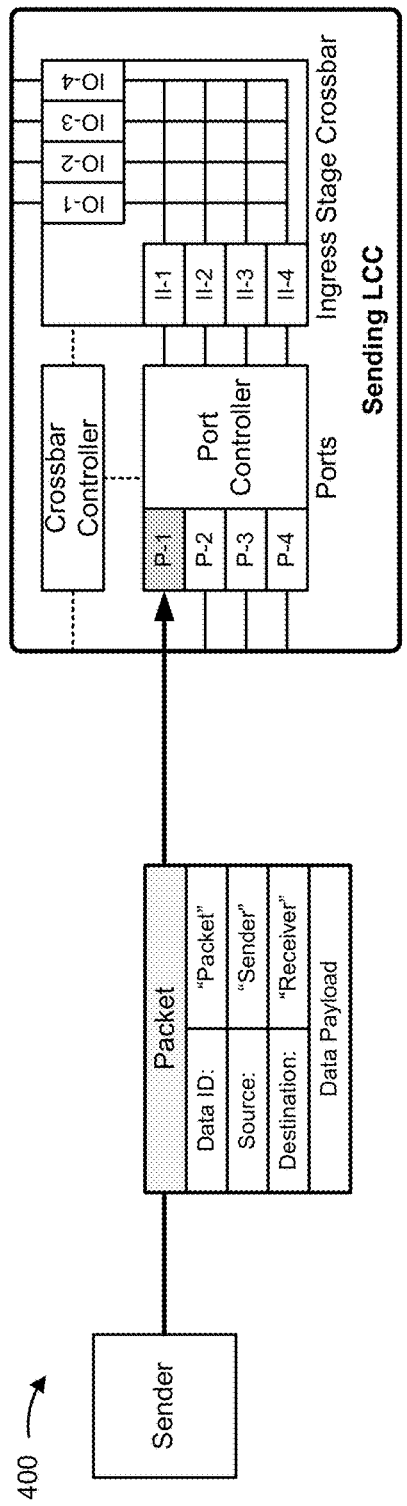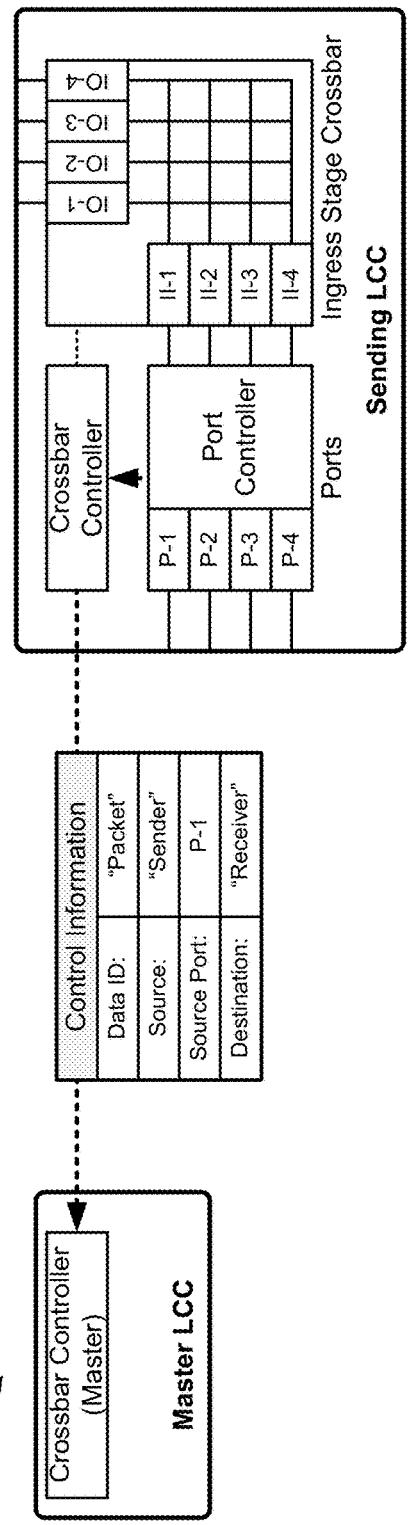
FIG. 4A
FIG. 4B

MULTI-CHASSIS SWITCH HAVING A MODULAR CENTER STAGE CHASSIS

RELATED APPLICATION

This application is a continuation of U.S. patent application Ser. No. 14/561,081, filed Dec. 4, 2014 (now U.S. Pat. No. 9,716,669), which is incorporated herein by reference.

BACKGROUND

A switch facilitates direct communication between network devices, connected to the switch's ports, by interconnecting the ports through a switch fabric. The switch fabric may include three stages: an ingress stage, an egress stage, and a center stage. Each stage may include one or more crossbar switches, hereinafter referred to as crossbars. Information may enter the switch fabric via an ingress stage crossbar, and may be routed, via one or more center stage crossbars, to an appropriate egress stage crossbar.

SUMMARY

According to some possible implementations, a system may comprise a first device associated with an ingress stage and an egress stage of a switch fabric. The first device may include a first crossbar which is associated with the switch fabric. The first device may comprise a first crossbar component, associated with the ingress stage, and a second crossbar component, associated with the egress stage. The system may further include a second device associated with a center stage of the switch fabric. The second device may include a second crossbar, associated with the switch fabric. The second crossbar may comprise a third crossbar component, associated with the center stage. The second device may further comprise a third crossbar, associated with the switch fabric. The third crossbar may comprise a fourth crossbar component associated with the center stage. The third crossbar component may connect, via one or more data links, to the first crossbar component and to the second crossbar component but not to the third crossbar. The fourth crossbar component may connect, via the one or more data links, to the first crossbar component and to the second crossbar component but not to the second crossbar. The system may comprise a first controller connecting, via one or more control links, to the first crossbar. The system may comprise a second controller connecting, via the one or more control links, to the second crossbar and to the first controller but not to the third crossbar. The system may comprise a third controller connecting, via the one or more control links, to the third crossbar and to the first controller but not to the second crossbar.

According to some possible implementations, a system may comprises a first switching component, installed in a first chassis, to receive data from a sending device. The data may be intended for a receiving device. The system may comprise a first controller, installed in the first chassis, to obtain first control information, associated with forwarding the data; identify, based on the first control information, a second switching component, installed in a second chassis, and a third switching component, installed in a third chassis; and control the first switching component to provide a first portion of the data, provided by the sending device, to the second switching component and a second portion of the data, provided by the sending device, to the third switching component. The system may comprise a second controller, separate from the first controller, to obtain, from a master controller, second control information associated with forwarding the data; identify, based on the second control information, a fourth switching component, not installed in the second chassis, connected to the receiving device; and control, based on the second control information, the second switching component to forward the first portion of the data to the fourth switching device. The system may comprise a third controller, separate from the first controller and independent of the second controller, to obtain, from a master controller, third control information associated with forwarding the data; identify, based on the third control information, the fourth switching component, not installed in the third chassis, connected to the receiving device; and control, based on the third control information, the third switching component to forward the second portion of the data to the fourth switching device.

According to some possible implementations, a system may comprise a chassis and a first group of switches installed within the chassis. Each switch, of the first group of switches, may include a first group of inputs and a first group of outputs. The system may comprise a first group of controllers, associated with the first group of switches, installed within the chassis. Each controller, of the first group of controllers, may be independent of any other controller, of the first group of controllers, and may correspond to a switch, of the first group of switches, to selectively control the switch to connect inputs, of the first group of inputs, with outputs, of the first group of outputs. The system may comprise a second group of switches, including a second group of inputs and a second group of outputs. The first group of inputs may connect, via a group of data links, to the second group of outputs, and the first group of outputs may connect, via the group of data links, to the second group of inputs. The system may comprise a second group of controllers, associated with the second group of switches, to control the second group of switches to selectively connect inputs, of the second group of inputs, to outputs, of the second group of outputs. The second group of controllers may control the first group of controllers. The second group of controllers may connect, via a group of control links, to the first group of controllers.

BRIEF DESCRIPTION OF THE DRAWINGS

FIGS. 4A-4G are diagrams of an example implementation relating to the example process shown in FIG. 3.

DETAILED DESCRIPTION

The following detailed description of example implementations refers to the accompanying drawings. The same reference numbers in different drawings may identify the same or similar elements.

A network switch facilitates efficient, directed communication between devices connected to the switch's ports by interconnecting the ports with a dynamically configurable switching fabric. The switch fabric may have three stages:

an ingress stage for receiving data from ports, an egress stage for forwarding the received data to ports, and a center stage for interconnecting the ingress stage to the egress stage. The ingress and egress stages may include ingress and egress crossbars for dynamically connecting ingress and egress ports, respectively, to one or more center stage crossbars. Each center stage crossbar may represent a data plane of the switch fabric, enabling a connection between a particular ingress port and a particular egress port. For example, the crossbars of the switch fabric may form a Clos network in some implementations.

The quantity of data planes of a switch's center stage determines, in part, the switch's bandwidth, while the ratio of data planes to ports determines the switch's blocking characteristics (i.e., the extent to which any available ingress port may be connected to any available egress port). Thus, increasing the quantity of center stage crossbars may improve the performance of the switch and/or may maintain the switch's performance when adding new ports. However, physical constraints, such as the capacity of an equipment rack, dimensions of a room, output of a power supply, performance of a cooling system, or the like, may limit the quantity of center stage crossbars which may be provided within a single chassis. Further, a network operator may have bandwidth and/or port quantity requirements that change over time. Thus, a fixed capacity center stage chassis may complicate and/or increase the cost and network downtime associated with the addition, removal, and/or replacement of center stage crossbars.

Implementing the center stage as a group of one or more independent center stage devices may provide a network operator with a multi-chassis network switch that is simple to implement and scalable while satisfying various physical constraints. Further, a center stage implemented using independent center stage devices does not present a single point of failure for the switch, thereby allowing the switch to continue operating despite a failure of one or more center stage devices.

Figure 1A:
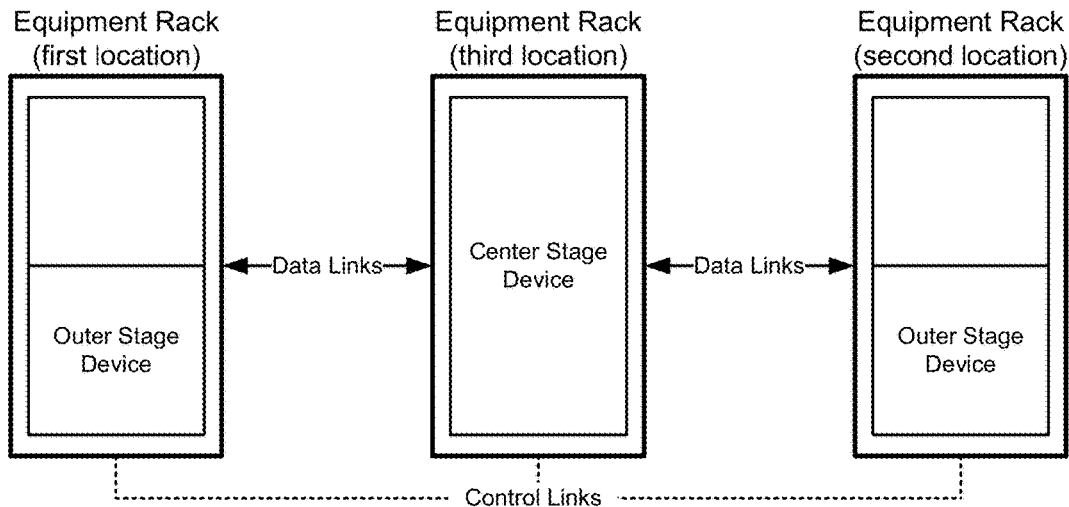
FIGS. 1A-1C are diagrams of overviews of example implementations described herein.
Figure 1A:
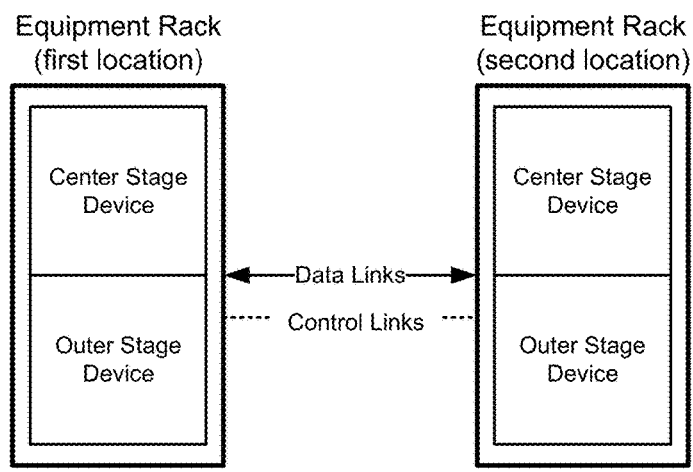
Figure 1B:
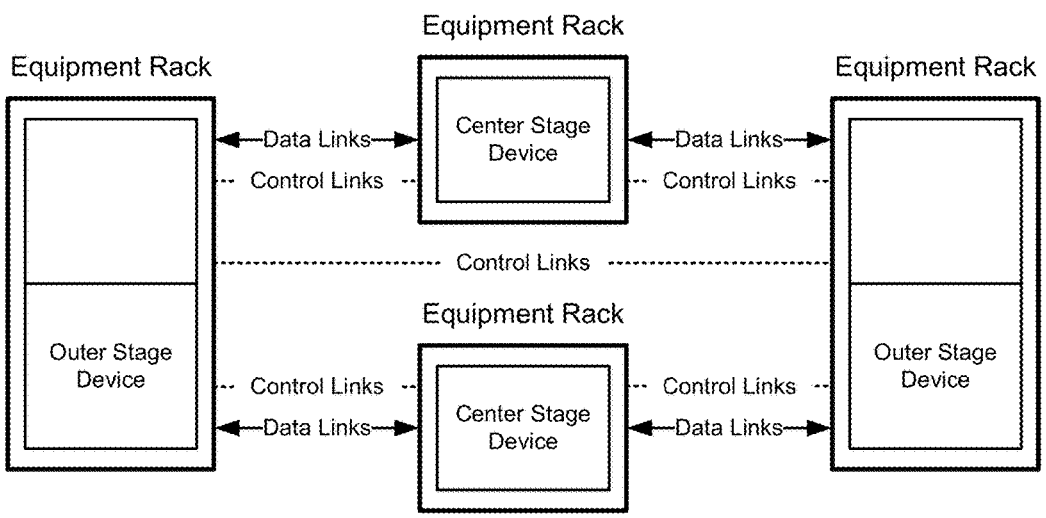
Figure 1C:
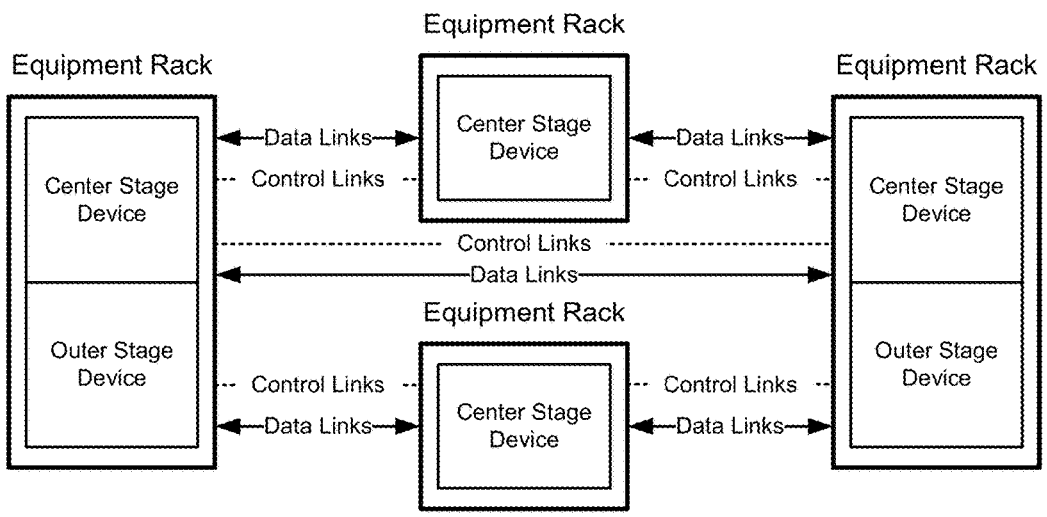

FIGS. 1A-1C are diagrams of overviews of example implementations 100-120 described herein.

As shown in FIG. 1A, assume, for example implementation 100, that a first switch includes: two equipment racks, each containing an outer stage device, at respective first and second locations; and another equipment rack, containing a center stage device, at a third location. Assume further that each of the outer stage devices connects, via data links, to the center stage device, to form a switch fabric for forwarding data to and/or from ports of the outer stage devices, and that all the devices interconnect, via control links, for exchanging control information associated with configuring the switch fabric.

Assume, for example implementation 100, that a second switch also includes outer stage devices located within equipment racks at first and second locations. Assume further that a center stage of the second switch includes a group of independent modular center stage devices apportioned between the equipment racks at the first and second locations. Thus, the use of modular center stage devices may allow the second switch to occupy less physical space than the first switch while providing the same performance. Further, in case of a failure of one or more modular center stage devices, the second switch may continue operating, albeit at reduced capacity, redundancy, and/or bandwidth, whereas a failure of the center stage chassis of the first switch may render the first switch inoperable.

As shown in FIG. 1B, assume, for example implementation 110, that a third switch also includes outer stage devices located within equipment racks at first and second locations. Assume further that the center stage of the third switch includes a group of independent modular center stage devices apportioned between two other equipment racks, physically and/or geographically separate from the equipment racks at the first and second locations. Thus, the use of modular center stage devices allows the third switch to implement a center stage which may be provided in different locations while providing the same performance as the first multi-chassis network switch. Thus, implementing the third switch may allow a network operator to operate a network when, e.g., particular physical limitations make providing a center stage device in a single location difficult or unfeasible and/or when physical and/or geographical diversity of data links may be desirable (e.g., for link protection). Like the second switch, the third switch may continue operating, albeit at reduced capacity, redundancy, and/or bandwidth, despite the failure of a modular center stage device.

As shown in FIG. 1C, assume, for example implementation 120, that a fourth switch also includes outer stage devices located within equipment racks at first and second locations. Assume further that the center stage of the third switch includes a first group of independent modular center stage devices apportioned between the equipment racks at the first and second locations and a second group of independent modular center stage devices apportioned between two other equipment racks, physically and/or geographically separate from the equipment racks at the first and second locations. For example, a network operator may initially implement only the first group of independent modular center stage devices (e.g., based on initial budget and/or performance requirements), resulting in the second switch shown in FIG. 1A, and may later implement the second group of independent modular center stage devices, and associated data/control links (e.g., based on subsequent budget and/or performance requirements). Alternatively, the network operator may initially implement only the second group of independent modular center stage devices, resulting in the third switch as shown in FIG. 1B, and may later implement the first group of independent modular center stage devices, and associated data/control links. Thus, implementing a switch using independent modular center stage devices may allow a network operator to modify and/or upgrade a switch, within particular physical and/or budgetary constraints, to improve performance, resilience, or the like without network downtime.

In this way, a network operator may use one or more independent modular center stage devices to implement a scalable, resilient multi-chassis network switch within particular physical constraints.

Figure 2:
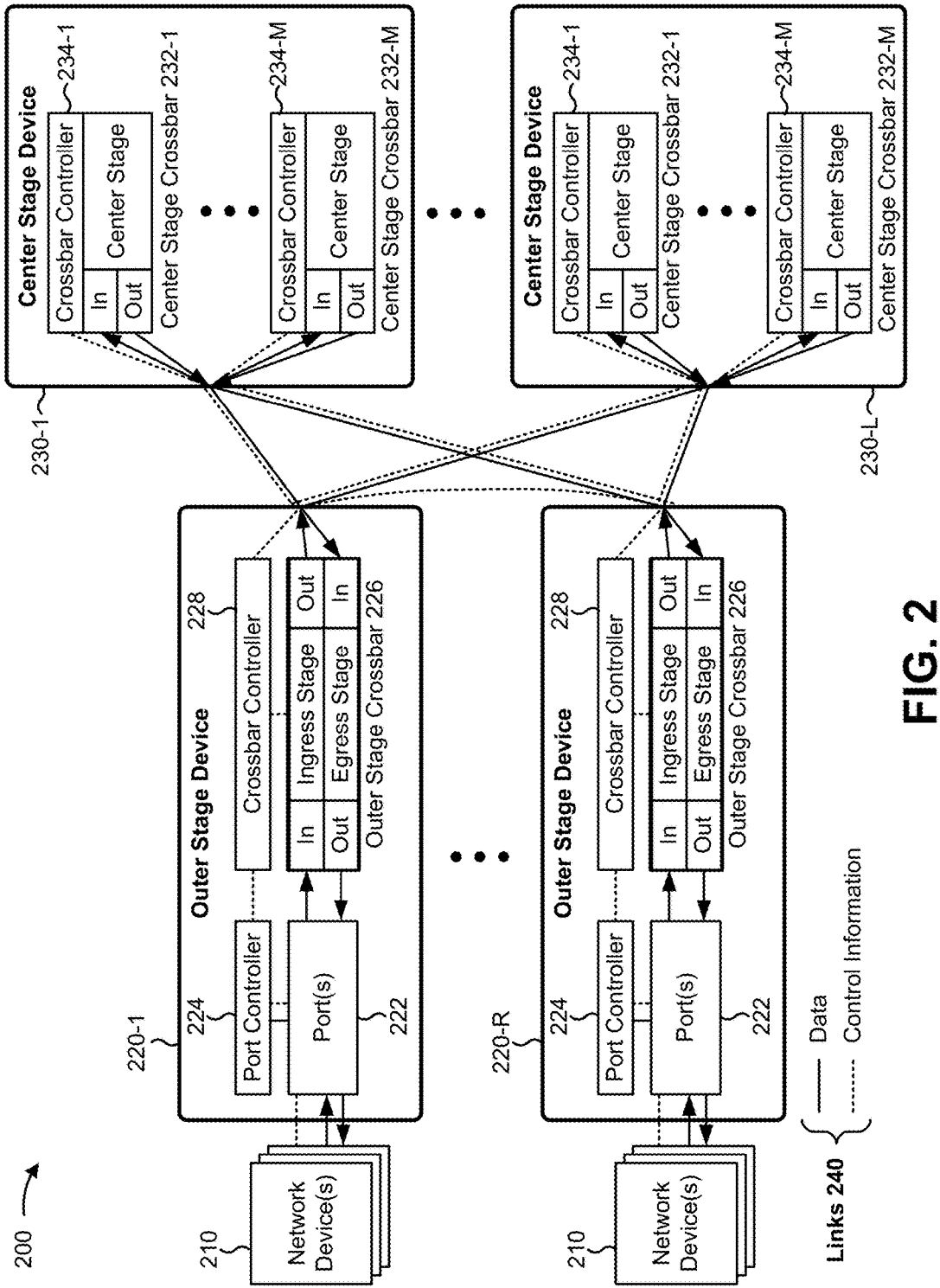
FIG. 2 is a diagram of an example implementation of a multi-chassis network switch having a modular center stage device.

FIG. 2 is a diagram of an example implementation of a multi-chassis network switch 200 having a modular center stage device. As shown in FIG. 2, switch 200 may forward data between network devices 210 and may include a group of outer stage devices 220-1, ..., 220-R (R≥1) (hereinafter referred to collectively as outer stage devices 220, and individually as outer stage device 220) and a group of center stage devices 230-1, ..., 230-L (L≥1) (hereinafter referred to collectively as center stage devices 230, and individually as center stage device 230). In some implementations, each outer stage device 220 and/or each center stage device 230 may include a separate chassis for housing components thereof (e.g., sized to fit in a particular physical space, such as within a communications rack, and/or sized to fit a particular quantity of components). In some implementations, outer stage devices 220 may be connected to each other and/or to center stage devices 230 via links 240 for transferring data and/or control information. In some implementations, center stage devices 230 may operate independently from each other without being connected to each other via links 240 for transferring data and/or control information. Links 240 may include wired connections (e.g., copper wire, optical fiber, or the like), wireless connections (e.g., radio signals, optical signals, or the like), or a combination of wired and wireless connections for transferring data and/or control information between devices.

Network device 210 may include a device capable of receiving, transmitting, processing, routing, etc. information (e.g., data packets). For example, network device 210 may include a line card chassis (LCC), a router, a switch, a gateway, a modem, a firewall, a network interface connection (NIC), a hub, a bridge, an optical add-drop multiplexer (OADM), or another type of network device. In some implementations, network device 210 may include one or more input ports associated with receiving packets and one or more output ports associated with transmitting packets. In some implementations, network device 210 may be connected (e.g., via one or more links 240) to switch 200 via an outer stage device 220 to send data, via switch 200, to another network device 210. In some implementations, network device 210 may send and/or receive control information to/from one or more devices of switch 200 (e.g., via one or more links 240).

Outer stage device 220 may include a device capable of receiving, storing, transmitting, processing, routing, etc. information (e.g., packets containing data and/or control information) associated with switch 200. For example, outer stage device 220 may include a LCC, a router, a switch, a gateway, a firewall, a bridge, or another type of network device. In some implementations, outer stage device 220 may include a group of one or more ports 222 (hereinafter referred to collectively as ports 222, and individually as port 222), a port controller 224, an outer stage crossbar 226, and a crossbar controller 228.

Ports 222 may receive and/or transmit packets (e.g., from and/or to one or more network devices 210). For example, ports 222 may include one or more input ports associated with receiving packets (e.g., from one or more network devices 210) and one or more output ports associated with transmitting packets (e.g., to one or more network devices 210).

Port controller 224 may include a component or collection of components, connected to crossbar controller 228 and ports 222, to receive incoming packets, to process incoming and/or outgoing packets, and/or to transmit outgoing packets. For example, port controller 224 may include ports (e.g., corresponding to, and/or integrated with, ports 222), an Ethernet interface, and/or another type of interface, a central processing unit (CPU), and/or a memory device. Port controller 224 may include packet processing component(s), switch interface component(s), Internet processor component(s), memory device(s), or the like. Port controller 224 may also represent a separate switch.

Port controller 224 may perform certain operations on incoming and/or outgoing packets, such as decapsulation, encapsulation, demultiplexing, multiplexing, queuing, dequeuing, etc., which may facilitate the processing and/or transportation of incoming and/or outgoing packets. Port controller 224 may receive incoming packets (e.g., via ports 222) and may forward the incoming packets to other port controllers 224 (e.g., via outer stage crossbar 226). For example, port controller 224 may receive incoming packets and may determine (e.g., based on control information received from crossbar controller 228) operations to perform and/or other port controllers 224 to which the incoming packets may be sent.

Port controller 224 may perform incoming packet buffering operations. For example, port controller 224 may receive packets and may remove header information from the packet. Port controller 224 may perform a segmentation operation on the packet data (e.g., on the data payload portion of the packet) by breaking the packet data into fixed-length fragments (herein, referred to collectively as "data units" and individually as a "data unit"). Port controller 224 may generate control blocks to store packet control information associated with the data units. Port controller 224 may store the data units in a data memory and may store the control blocks in a control memory. Alternatively, or additionally, port controller 224 may send the control blocks to crossbar controller 228.

Port controller 224 may perform outgoing packet buffering operations. For example, port controller 224 may retrieve control blocks from control memory and may remove control protection information from the control blocks (e.g., checksum information and/or other forms of control protection information). From the control protection information, port controller 224 may perform a data integrity operation to determine whether the packet control information, obtained from the control blocks, contains an error. Port controller 224 may, based on the packet control information, retrieve data units from data memory and may reorder/reassemble the data units into outgoing packets for transmission to another outer stage device 220 and/or a network device 210. Port controller 224 may communicate with another port controller 224 by, e.g., sending control information (e.g., control blocks) to crossbar controller 228, which may forward the control information to the another port controller 240 (e.g., via another crossbar controller 228 interconnected by links 240). Additionally, or alternatively, port controller 224 may communicate with another port controller 224 by sending data units to outer stage crossbar 226, which may forward the data units to the other port controller 240 (e.g., via a center stage device 230 interconnected via links 240).

Outer stage crossbar 226 may include an ingress stage crossbar component and an egress stage crossbar component. The ingress stage crossbar components of the outer stage crossbars 226 of the outer stage devices 220 may, together, act as an ingress stage of a switch fabric of switch 200. The ingress stage crossbar component of outer stage crossbar 226 may include input cross-points connected (e.g., via links 240) to ports 222, output cross-points connected (e.g., via links 240) to one or more center stage crossbars 232, and a controllable switching device to interconnect particular input cross-point(s) with particular output cross-point(s). The ingress stage crossbar component may, thus, be configured (e.g., by crossbar controller 228) to receive packets from ingress ports 222 and provide the packets to the one or more center stage crossbars 232.

Likewise, the egress stage crossbar components of the outer stage crossbars 226 of the outer stage devices 220 may, together, act as an egress stage of the switch fabric of switch 200. The egress stage crossbar component of outer stage crossbar 226 may include input cross-points connected (e.g., via links 240) to one or more center stage crossbars 232, output cross-points connected (e.g., via links 240) to ports 222, and a controllable switching device to interconnect particular input cross-point(s) with particular output cross-point(s). The egress stage crossbar component may, thus, be configured (e.g., by crossbar controller 228) to receive packets from the one or more center stage crossbars 232 and provide the packets to egress ports 222.

Crossbar controller 228 may include a processor, a microprocessor, some form of hardware component (e.g., an application specific integrated circuit (ASIC) or a field programmable gate array (FPGA)), or a similar type of processing component. In some implementations, for example, crossbar controller 228 may include a memory component, such as a random access memory (RAM), a read only memory (ROM), content-addressable memory (CAM), and/or another type of dynamic or static storage device (e.g., a flash memory, a magnetic memory, an optical memory, etc.) that stores information and/or instructions. In some implementations, for example, crossbar controller 228 may include a storage component, such as a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive. In some implementations, for example, crossbar controller 228 may include an Ethernet controller and/or another controller component. Crossbar controller 228 may perform high-level management functions for switch 200. For example, crossbar controller 228 may communicate with other networks and/or systems connected to switch 200 to exchange control information regarding network topology (e.g., to detect the addition, removal, and/or failure of a network device 210, an outer stage device 220, a center stage device 230, a link 240, and/or a component thereof).

Crossbar controller 228 may create, based on the control information, and/or maintain, in memory associated with crossbar controller 228, a routing table and/or forwarding table(s). Crossbar controller 228 may send and/or receive (e.g., via one or more links 240) control information to/from port controller 224, another crossbar controller 228, and/or a crossbar controller 234 of a center stage device 230. Crossbar controller 228 may control outer stage crossbar 226 to send data to one or more center stage crossbars 232 via an ingress stage crossbar component of outer stage crossbar 226 and/or to receive data from one or more center stage crossbars 232 via an egress stage crossbar component of outer stage crossbar 226. Crossbar controller 228 may also perform other general control and monitoring functions for switch 200. For example, crossbar controllers 228, associated with switch 200, may select a particular crossbar controller 228 to act as a master crossbar controller 228 to centralize control functions of switch 200. Alternatively, or additionally, multiple crossbar controllers 228 may act, together or separately, as master crossbar controllers (e.g., control functions may be shared and/or duplicated among controllers). For example, each crossbar controller 228 of switch 200 may continuously, periodically, and/or occasionally broadcast control information to the other crossbar controllers 228 of switch 200 (e.g., using a switch and/or hub associated with a control plane of switch 200).

Center stage device 230 may include a device capable of receiving, storing, transmitting, processing, routing, etc. information (e.g., packets containing data and/or control information) associated with a center stage of a switch fabric of switch 200. In some implementations, center stage device 230 may include a group of one or more center stage crossbars 232-1, . . . , 232-M (M≥1) (hereinafter referred to collectively as center stage crossbars 232, and individually as center stage crossbars 232) and a corresponding group of one or more crossbar controllers 234-1, . . . , 234-M (hereinafter referred to collectively as crossbar controllers 234, and individually as crossbar controller 234). For example, a subset of the group of center stage crossbars 232 may be integrated with a corresponding subset of the group of crossbar controllers 234 to form a fabric card, and center stage device 230 may include a group of fabric cards installed in a modular chassis.

Center stage crossbar 232 may include a center stage crossbar component. The center stage crossbar components of the center stage crossbars 232 of the center stage devices 230 may, together, act as a center stage of a switch fabric of switch 200 and may be configured (e.g., by crossbar controller 234) to receive packets from an ingress stage of one or more outer stage crossbars 226 and provide the packets to an egress stage of one or more outer stage crossbars 226.

The center stage crossbar component may include input cross-points and output cross-points, connected to one or more outer stage crossbars 226 (e.g., via links 240), and a controllable switching device to interconnect particular input cross-point(s) with particular output cross-point(s). A quantity of input and/or output cross-points may be determined based on a maximum expected quantity of outer stage devices 220 (e.g., R in FIG. 2). For example, the quantity of input and/or output cross-points may be equal to, or greater than, the maximum expected quantity of outer stage devices 220 such that each center stage crossbar 232 may be connected to, and therefore provide a data plane for, each outer stage device 220. Alternatively, the quantity of input and/or output cross-points may be fewer than the maximum expected quantity of outer stage devices 220 such that, for a quantity of outer stage devices 220 greater than the quantity of input and/or output cross-points, each center stage crossbar 232 may provide a data plane for only a subset of the outer stage devices 220. Center stage crossbars 232 having insufficient input and/or output cross-points to connect to every outer stage device 220 may be interconnected (e.g., via links 240) to form a multi-staged crossbar switch, and/or the quantity of outer stage devices 220 to be connected to center stage crossbar 232 may be reduced by splitting switch 200 into two switches 200.

Crossbar controller 234 may include a processor, a microprocessor, some form of hardware component (e.g., an ASIC or an FPGA), or a similar type of processing component. In some implementations, for example, crossbar controller 234 may include a memory component (e.g., one or more of a RAM, a ROM, a CAM, a flash memory, a magnetic memory, an optical memory, or the like) and/or a storage component (e.g., one or more of a hard disk, a CD, a DVD, a floppy disk, a cartridge, a magnetic tape, and/or another type of computer-readable medium, along with a corresponding drive) that stores information and/or instructions. In some implementations, for example, crossbar controller 234 may include an Ethernet controller and/or another controller component. Crossbar controller 234 may communicate with a crossbar controller 228 (e.g., a master crossbar controller 228) to exchange control information regarding network topology (e.g., to detect the addition, removal, and/or failure of a network device 210, an outer stage device 220, a center stage device 230, a link 240, and/or a component thereof). Crossbar controller 234 may receive and/or maintain, in memory associated with crossbar controller 234, a routing table and/or forwarding table(s) associated with forwarding data between outer stage devices 220. Crossbar controller 234 may send and/or receive (e.g., via one or more links 240) control information to/from the master crossbar controller 234. Crossbar controller 234 may control center stage crossbar 232 to forward information received from an outer stage crossbar 226 to one or more outer stage crossbars 226.

Each crossbar controller 234 may operate independently from other crossbar controllers 234.

The number and arrangement of devices and connections shown in FIG. 2 are provided as an example. In practice, there may be additional devices and/or connections, fewer devices and/or connections, different devices and/or connections, or differently arranged devices and/or connections than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of switch 200 may perform one or more functions described as being performed by another set of devices of switch 200.

Figure 3:
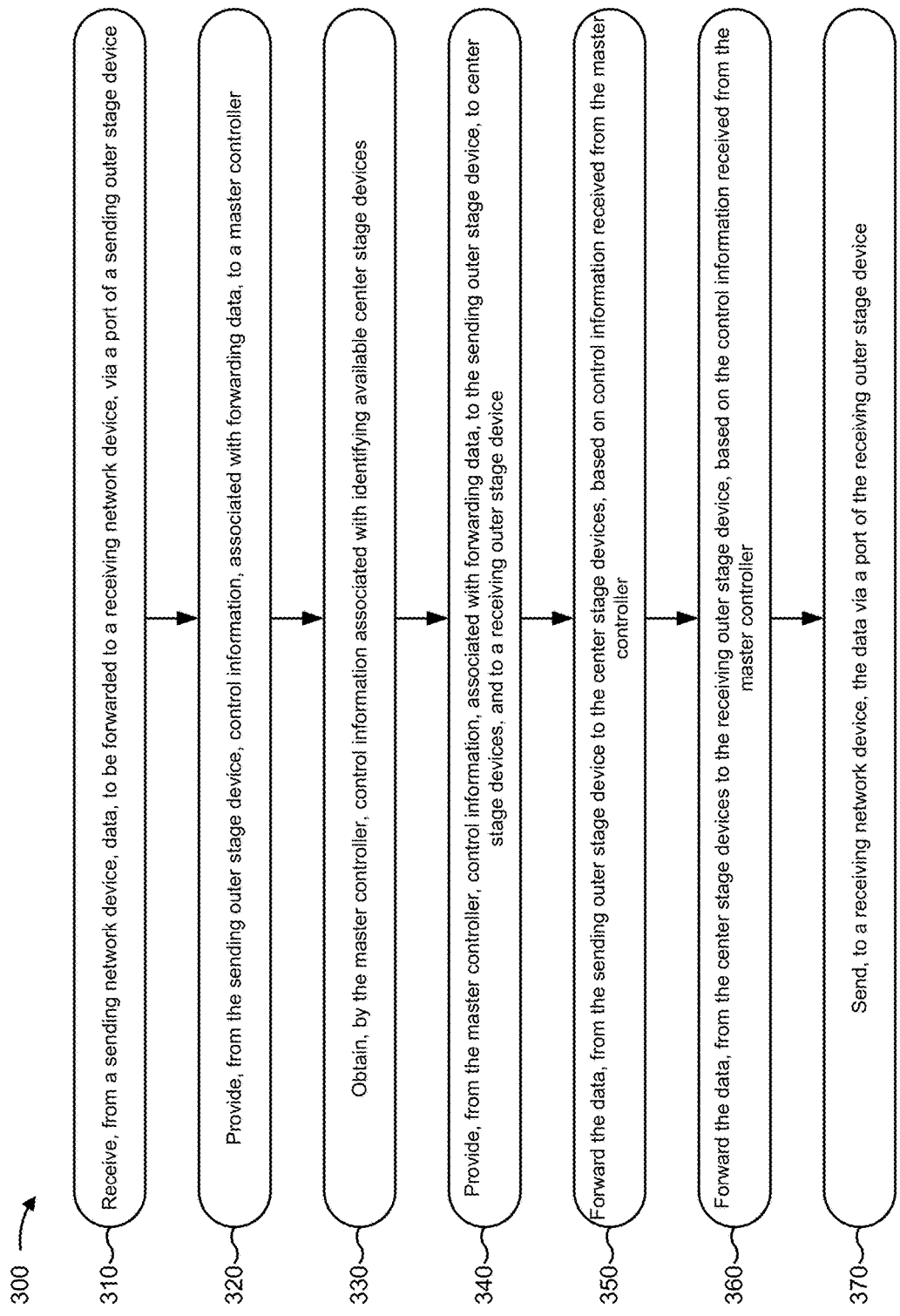
FIG. 3 is a flow chart of an example process for forwarding data using a multi-chassis network switch having one or more independent modular center stage devices.

FIG. 3 is a flow chart of an example process 300 for forwarding data using a multi-chassis network switch having one or more independent modular center stage devices. In some implementations, one or more process blocks of FIG. 3 may be performed by devices of switch 200 (e.g., outer stage device 220 and/or center stage device 230). In some implementations, one or more process blocks of FIG. 3 may be performed by another device or a group of devices separate from or including switch 200 (e.g., a network device 210).

As shown in FIG. 3, process 300 may include receiving, from a sending network device, data, to be forwarded to a receiving network device, via a port of a sending outer stage device (block 310). For example, a sending network device 210 may provide, via link(s) 240, data (e.g., as a packet) to an ingress port 222 of an outer stage device 220 associated with a switch 200. Outer stage device 220 may likewise receive the data from sending network device 210 via ingress port 222. The data may include a payload and/or control information associated with forwarding the data to one or more recipients. In this way, switch 200 may receive, via port(s) 222 of outer stage device(s) 220, data to be forwarded between network device(s) 210.

As further shown in FIG. 3, process 300 may include providing, from the sending outer stage device, control information, associated with forwarding data, to a master controller (block 320). For example, a port controller 224 associated with ingress port 222 may identify, from data received by ingress port 222, and/or determine, based on receiving the data, control information associated with forwarding the data. The control information may identify sending network device 210, one or more recipient devices, ingress port 222, one or more links 240, a sending date/time, or the like. Port controller 224 may provide, via link(s) 240, the control information to a crossbar controller 228 associated with outer stage device 220. In some implementations, the control information may include information associated with a functionality (e.g., a power state, an offline/online status, an error state, or the like) and/or a connectivity of port(s) 222. Crossbar controller 228 may likewise receive the control information from port controller 224. Crossbar controller 228 may process (e.g., along with previously received control information) and/or store the control information in a routing table, in one or more forwarding table(s), as a functionality/connectivity status of devices of switch 200, or the like.

In some implementations, crossbar controller 228 of outer stage device 220 may act as a master controller for switch 200 by maintaining reference control information for other devices of switch 200 and/or by controlling other devices of switch 200 (e.g., center stage device(s) 230 and/or other outer stage devices 220).

In some implementations, another controller or group of controllers (e.g., another crossbar controller 228 and/or a controller of a network device 210) may act as a master controller of switch 200. Crossbar controller 228 may likewise act as a slave controller for switch 200. For example, crossbar controller 228 may provide, via link(s) 240, control information, associated with and/or stored by outer stage device 220, to the master controller. In some implementations, crossbar controller 228 of outer stage device 220 may provide, as control information to the master controller, information associated with a functionality (e.g., a power state, an offline/online status, an error state, or the like) and/or a connectivity of outer stage device 220 to enable the master controller to identify outer stage device 220's association with switch 200 and/or connectivity to center stage device(s) 230 and/or to other outer stage devices 220. In this way, the master controller may identify outer stage device(s) 220 which form ingress and egress stages of switch 200's switch fabric and port(s) 222, of outer stage device(s) 220, by which network device(s) 210, for whom data is to be forwarded, connect to switch 200.

As further shown in FIG. 3, process 300 may include obtaining, by the master controller, control information associated with identifying available center stage devices (block 330). For example, the master controller may receive control information, via link(s) 240, from center stage device(s) 230 of switch 200, from outer stage device(s) 220 connected to the center stage device(s) 230, and/or from another device (e.g., a network device 210). The control information may identify the center stage device(s) 230 of switch 200, center stage crossbar(s) 232 of the center stage device(s) 230, and/or links 240 connecting the center stage device(s) 230 and/or center stage crossbar(s) 232 with outer stage device(s) 220. The master controller may receive control information based on sending, via link(s) 240, a request to another device (e.g., to center stage device(s) 230 and/or to outer stage device(s) 220 connected thereto).

Alternatively, or additionally, the master controller may receive control information based on the satisfaction of a threshold condition (e.g., based on a schedule, a connection/disconnection of a device of switch 200, or the like). For example, center stage device 230 may provide control information upon connecting to other devices of switch 200 (e.g., as a broadcast) and/or outer stage device 220 may provide control information upon detecting the connection and/or disconnection of a center stage device 230 (e.g., based on a status of one or more link(s) 240 between outer stage device 220 and center stage device 230, detection of an error associated with outer stage device 220 forwarding data via center stage device 230, or the like).

Additionally, or alternatively, the master controller may generate control information based on performing an operation to identify center stage device(s) 230 of switch 200 (e.g., based on receiving a response to a request provided to link(s) 240 associated with center stage crossbar(s) 232 and/or crossbar controller(s) 234 associated with the center stage crossbar(s) 232). In this way, the master controller may identify center stage crossbar(s) 232 and center stage device(s) 230 which, though operating independently from one another, together serve as the center stage of switch 200.

As further shown in FIG. 3, process 300 may include providing, from the master controller, control information, associated with forwarding data, to the sending outer stage device, to center stage devices, and to a receiving outer stage device (block 340). For example, the master controller may send control information to crossbar controller(s) 228 of all or some of outer stage device(s) 220 of switch 200 (e.g., to outer stage device(s) 220 connected to sending network device 210 and/or to a receiving network device(s) 210). The control information may include information associated with controlling an outer stage crossbar 226 of outer stage device 220. For example, the control information may include instructions (e.g., a routing table and/or forwarding table) used by crossbar controller 228 to interconnect input cross-point(s) with output cross-point(s) of outer stage crossbar 226. In some implementations, the control information may include information associated with controlling operations performed by port controller 224 (e.g., encapsulation, decapsulation, segmentation, concatenation, or the like).

Additionally, or alternatively, the master controller may send control information to crossbar controller(s) 234 of all or some center stage device(s) 230 of switch 200 (e.g., to particular center stage device(s) 230 via which outer stage device(s) 220 are to forward data from sending network device 210 and receiving network device(s) 210). The control information may include information associated with controlling center stage crossbar(s) 232 of center stage device(s) 230. For example, the control information may include instructions (e.g., a routing table and/or forwarding table) used by crossbar controller 234 to interconnect input cross-point(s) with output cross-point(s) of center stage crossbar 232. In this way, the master controller may distribute control information associated with controlling devices of switch 200, to controllers associated with the devices of switch 200 without requiring the exchange of control information between center stage device(s) 230 or center stage crossbar(s) 232.

As further shown in FIG. 3, process 300 may include forwarding the data, from the sending outer stage device to the center stage devices, based on control information received from the master controller (block 350). For example, in some implementations, crossbar controller 228 of outer stage device 220 may determine, based on the control information, operations to be performed by port controller 224. Crossbar controller 228 may likewise control port controller 224 to perform those operations. Crossbar controller 228 may determine, based on the control information, interconnections to be made between particular input cross-point(s) (e.g., corresponding to port(s) 222 to which sending network device 210 is connected) and particular output cross-points (e.g., corresponding to data planes of switch 200's center stage) of an ingress stage of outer stage crossbar 226. Crossbar controller 228 may likewise control outer stage crossbar 226 to make those interconnections.

Port controller 224 may perform operations on the data received via port(s) 222 and may provide the data to the particular input cross-point(s), of the ingress stage, whereby the data may be forwarded from the particular output cross-point(s) to center stage device(s) 230 connected to the particular output cross-point(s) via link(s) 240. Likewise, center stage crossbar(s) 232, of center stage device(s) 230, may receive, via input cross-point(s) corresponding to the particular output cross-point(s) of the ingress stage, the data sent from outer stage device 220. In this way, switch 200 may forward data from an ingress stage, of an outer stage device 220 connected to a sending network device 210, to a center stage formed by one or more independent center stage crossbars 234 of center stage device(s) 230.

As further shown in FIG. 3, process 300 may include forwarding the data, from the center stage devices to the receiving outer stage device, based on the control information received from the master controller (block 360). For example, a crossbar controller 234, associated with a particular center stage crossbar 232, of center stage device 230, to which outer stage device 220 sends the data, may determine, based on the control information, interconnection(s) to be made between a particular input cross-point (e.g., associated with link(s) 240 via which center stage device 230 receives the data from a particular sending outer stage device 220) and particular output cross-point(s) (e.g., associated with link(s) 240 via which center stage device 230 sends the data to a particular receiving outer stage device 220) of a center stage of center stage crossbar 232. Crossbar controller 234 may likewise direct center stage crossbar 323 to make those interconnections such that center stage crossbar 230 forwards the data received from the sending outer stage device 220, via the particular input cross-point and corresponding link(s) 240, to the receiving outer stage device(s) 220, via the particular output cross-point(s) and corresponding link(s) 240. In this way, switch 200 may forward data from the center stage, formed by one or more independent center stage crossbars 234 of center stage device(s) 234, to an egress stage, of an outer stage device 220 connected to a receiving network device 210.

As further shown in FIG. 3, process 300 may include sending, to a receiving network device, the data via a port of the receiving outer stage device (block 370). For example, crossbar controller 228 of receiving outer stage device 220 may determine, based on control information (e.g., stored by receiving outer stage device 220 and/or received from the master controller), interconnections to be made between particular input cross-points (e.g., corresponding to data planes of switch 200's center stage) and particular output cross-points (e.g., corresponding to port(s) 222 to which receiving network device(s) 210 are connected) of an egress stage of outer stage crossbar 226. Crossbar controller 228 may likewise control outer stage crossbar 226 to make those interconnections. In some implementations, crossbar controller 228 may determine, based on the control information, operations to be performed by port controller 224.

Outer stage crossbar 226, of receiving outer stage device 220, may receive, via the particular input cross-point(s), the data sent from center stage device(s) 230 to thereby provide the data to receiving network device(s) 210 connected to egress port(s) 222 associated with the particular output cross-point(s). In some implementations, crossbar controller 228 may control port controller 224 to perform operations based on the configuration information. In this way, switch 200 may forward data from an egress stage, of an outer stage device 220, to port(s) 222 connected to receiving network device(s) 210.

Although FIG. 3 shows example blocks of process 300, in some implementations, process 300 may include additional blocks, fewer blocks, different blocks, or differently arranged blocks than those depicted in FIG. 3. Additionally, or alternatively, two or more of the blocks of process 300 may be performed in parallel.

FIGS. 4A-4G are diagrams of an example implementation 400 relating to the example process 300 shown in FIG. 3. FIGS. 4A-4G show examples of forwarding data using a multi-chassis network switch having one or more independent modular center stage devices.

As shown in FIG. 4A, assume, for example implementation 400, that a sender (e.g., a network device 210) sends a packet to a port P-1 (e.g., a port 222) of a sending LCC (e.g., an outer stage device 220). Assume further that the packet includes a data payload and control information, associated with forwarding the packet, which identifies the packet as "Packet," having "sender" as a source and "receiver" as a destination.

As shown in FIG. 4B, assume, for example implementation 400, that a port controller (e.g., port controller 224), associated with port P-1 of the sending LCC, identifies the control information associated with forwarding the packet and supplements the control information to identify a source port of the packet (e.g., port P-1). Assume further that the port controller provides the supplemented control information to a crossbar controller (e.g., a crossbar controller 228), of the sending LCC, which updates previously stored control information (e.g., a forwarding table) based on the supplemented control information. Assume further that the crossbar controller provides the supplemented control information to a master crossbar controller (e.g., a crossbar controller 228 of another outer stage device 220, shown as "Master LCC") to enable the master crossbar controller to update the master crossbar controller's stored control information.

Figure 4C:
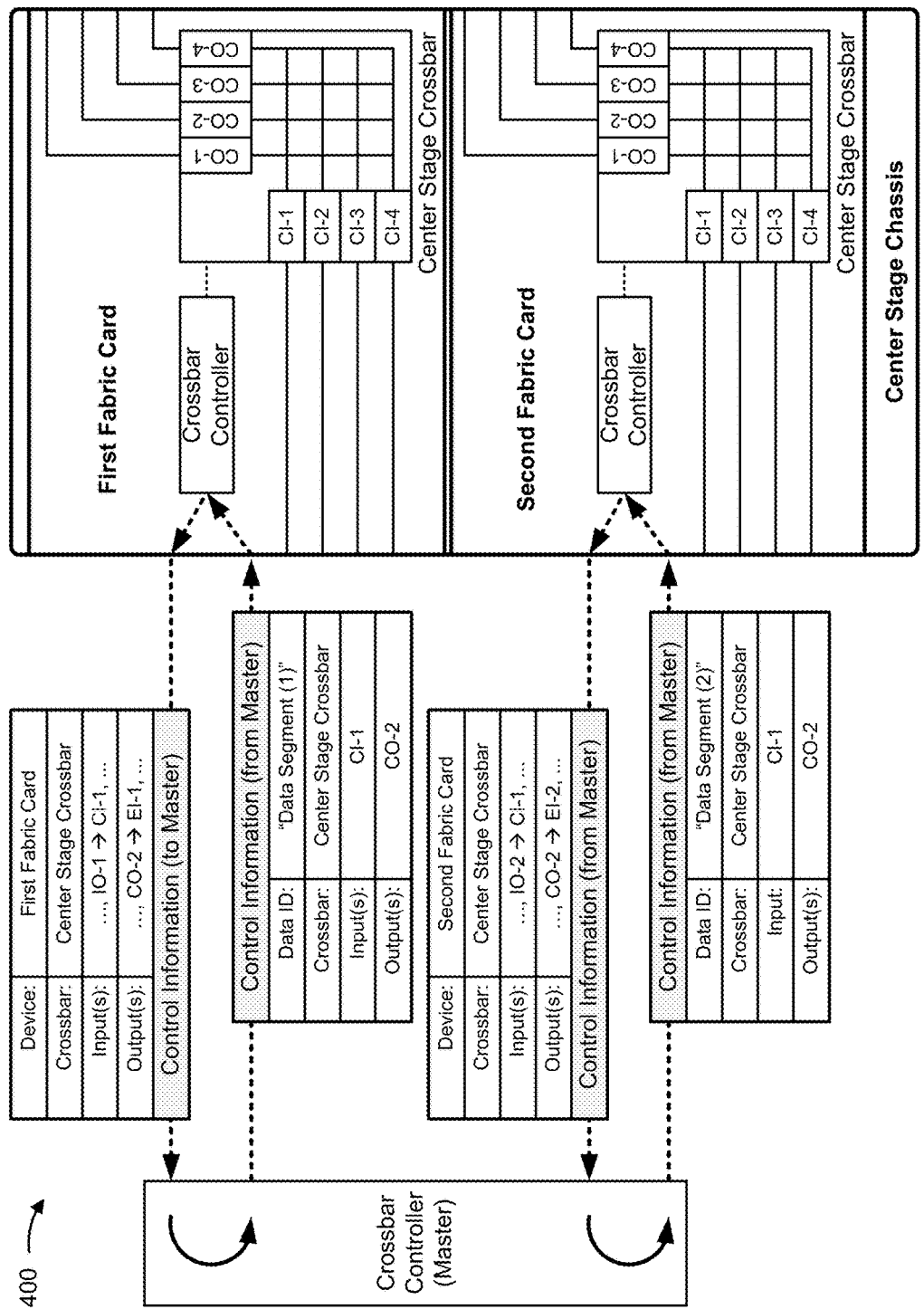

As shown in FIG. 4C, assume, for example implementation 400, that a first fabric card, including a center stage crossbar (e.g., a center stage crossbar 232) and a corresponding crossbar controller (e.g., a crossbar controller 234), is installed in a center stage chassis (e.g., a center stage device 230). Assume further that the crossbar controller sends control information, associated with the center stage crossbar, to the master crossbar. The control information identifies the first fabric card as the device, the center stage crossbar as the crossbar, and connections between the center stage crossbar's input/output cross-points and cross-points of other devices. Assume that the control information indicates that input cross-point CI-1 is connected to output cross-point IO-1 of the sending LCC's ingress stage crossbar. Assume that the control information further indicates that output cross-point CO-2 is connected to input cross-point EI-1 of a receiving LCC's egress crossbar (e.g., an egress stage of an outer stage crossbar 226 of an outer stage device 220).

Assume that the master crossbar controller receives the control information from the crossbar controller and updates control information stored by the master crossbar controller. Based on the updated control information, the master crossbar controller determines that the receiver is connected to a port of the receiving LCC and sends control information to the first fabric card's crossbar controller. The control information indicates that the first fabric card's center stage crossbar is to interconnect input cross-point CI-1 and output cross-point CO-2 to forward "Data Segment (1)" to input cross-point EI-1 of the receiving LCC's egress crossbar.

Assume that a second fabric card is also installed in the center stage chassis. Assume further that the second fabric card's crossbar controller similarly exchanges control information with the master crossbar controller. The master crossbar controller thus receives, from the second fabric card's crossbar controller, control information indicating that input cross-point CI-1 is connected to output cross-point IO-2 of the sending LCC's ingress stage crossbar and that output cross-point CO-2 is connected to input cross-point EI-2 of a receiving LCC's egress crossbar. Likewise, the master crossbar controller sends, to the crossbar controller of the second fabric card, control information indicating that the first fabric card's center stage crossbar is to interconnect input cross-point CI-1 and output cross-point CO-2 to forward "Data Segment (2)" to input cross-point EI-2 of the receiving LCC's egress crossbar.

Figure 4D:
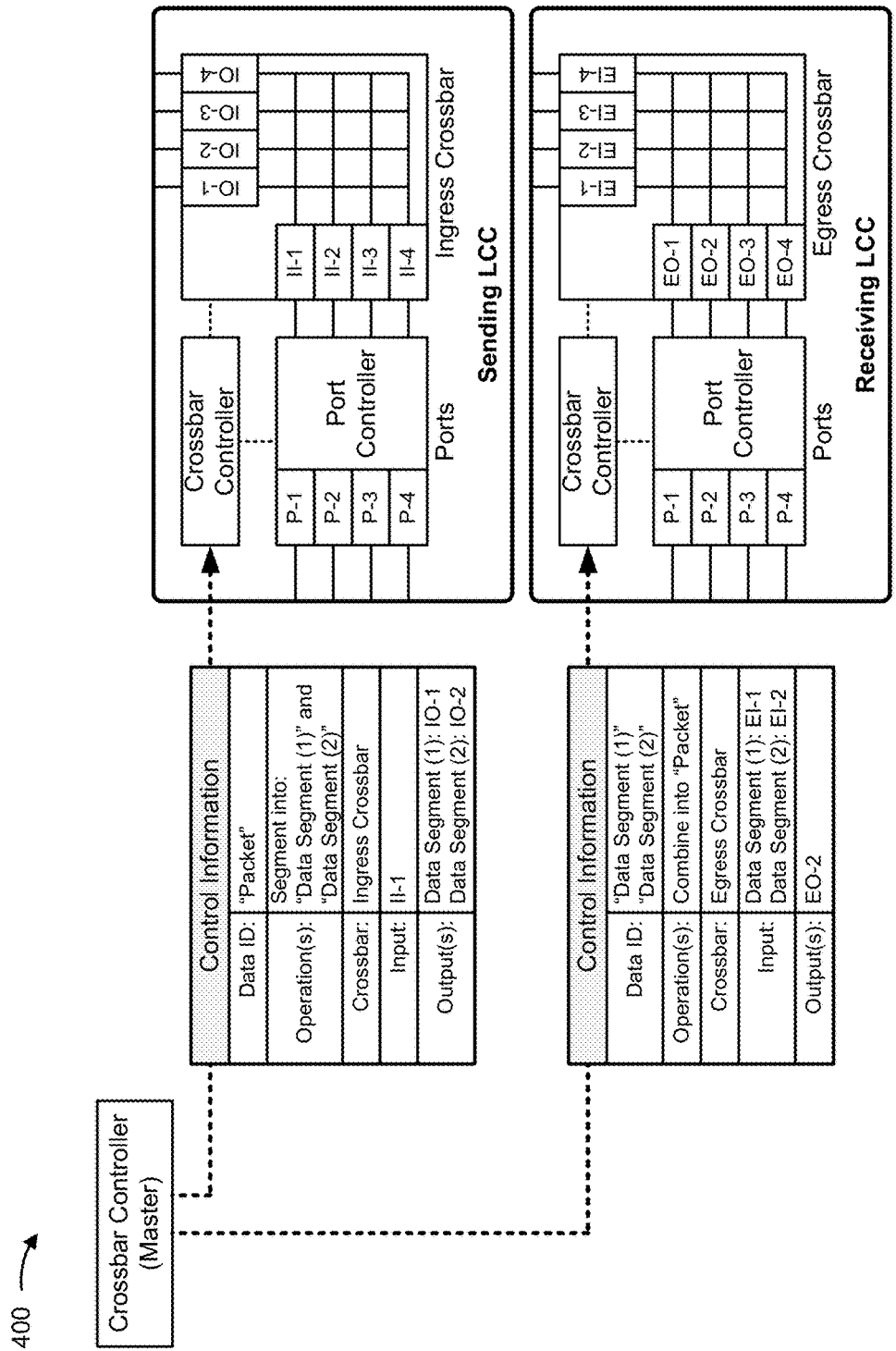

As shown in FIG. 4D, assume, for example implementation 400, that the master crossbar controller sends, to the crossbar controller of the sending LCC, control information indicating that the port controller is to segment "Packet" into "Data Segment (1)" and "Data Segment (2)" and the ingress crossbar to interconnect input cross-point II-1 with output cross-points IO-1 and IO-2 to forward "Data Segment (1)" and "Data Segment (2)," respectively. Assume further that the master crossbar controller sends, to a crossbar controller of a receiving LCC, control information indicating that the egress crossbar is to interconnect input cross-points EI-1 and EI-2 with output cross-point EO-2 to forward "Data Segment (1)" and "Data Segment (2)," respectively, and that the port controller is to combine "Data Segment (1)" and "Data Segment (2)" into "Packet."

Figure 4E:
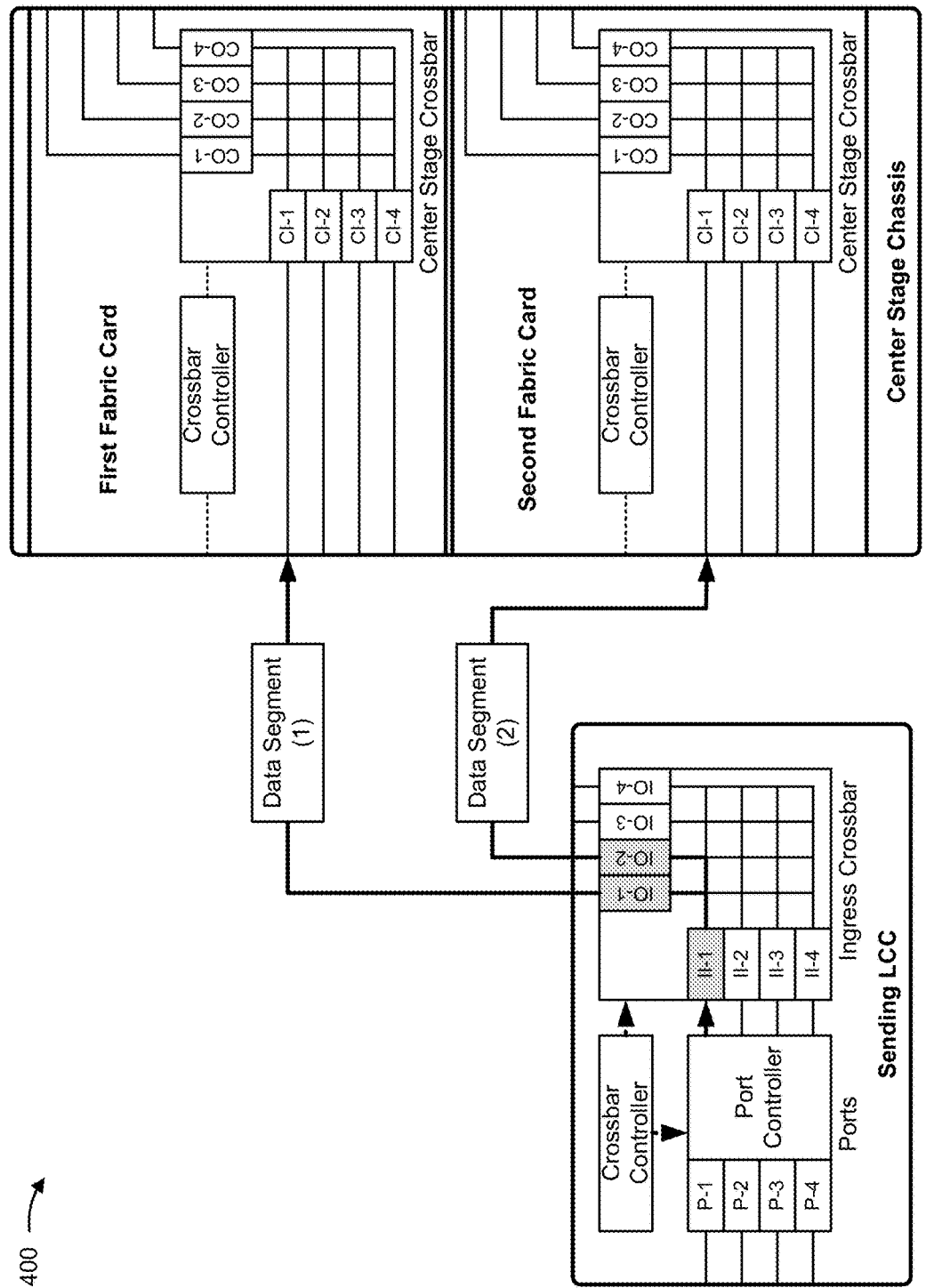

As shown in FIG. 4E, assume, for example implementation 400, that the crossbar controller of the sending LCC controls, based on the control information received from the master crossbar controller, the port controller to segment "Packet" into "Data Segment (1)" and "Data Segment (2)" and provide each segment to input cross-point II-1 of the ingress crossbar. Assume further that the crossbar controller of the sending LCC controls, based on the control information received from the master crossbar controller, the ingress crossbar to interconnect input cross-point II-1 with output cross-point IO-1 to forward "Data Segment (1)" to the center stage crossbar of the first fabric card and to interconnect input cross-point II-1 with output cross-point IO-2 to forward "Data Segment (2)" to the center stage crossbar of the second fabric card.

Figure 4F:
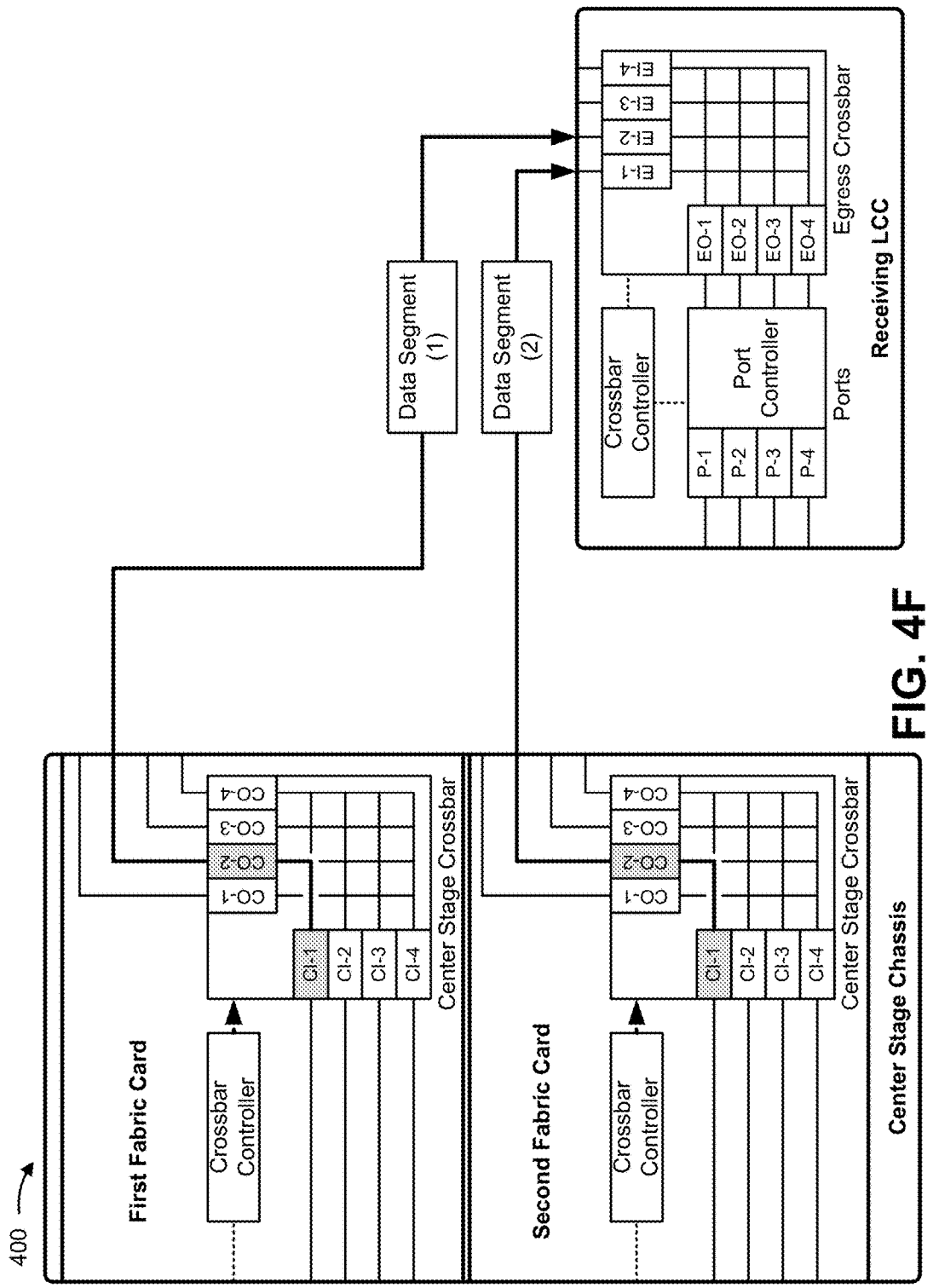

As shown in FIG. 4F, assume, for example implementation 400, that the crossbar controller of the first fabric card controls, based on the control information received from the master crossbar controller, the center stage crossbar to interconnect input cross-point CI-1 with output cross-point CO-2 to forward "Data Segment (1)" from output cross-point IO-1 of the sending LCC's ingress crossbar to input cross-point EI-1 of the receiving LCC's egress crossbar. Likewise, the crossbar controller of the second fabric card controls, based on the control information received from the master crossbar controller, the center stage crossbar to interconnect input cross-point CI-1 with output cross-point CO-2 to forward "Data Segment (2)" from output cross-point IO-2 of the sending LCC's ingress crossbar to input cross-point EI-2 of the receiving LCC's egress crossbar.

Figure 4G:
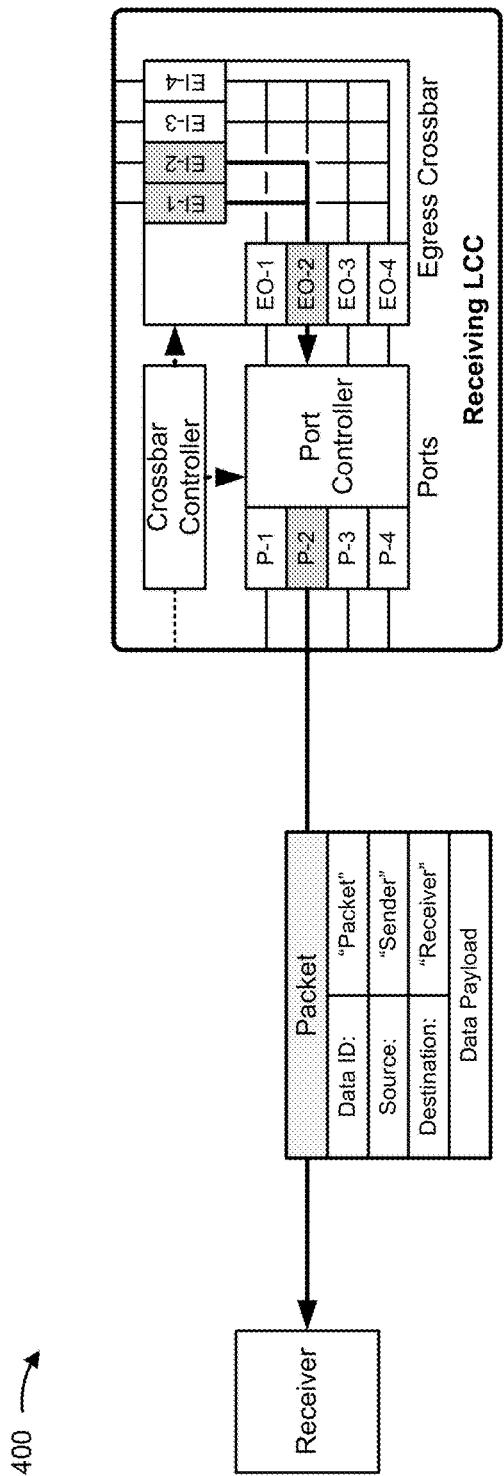

As shown in FIG. 4G, assume, for example implementation 400, that the crossbar controller of the receiving LCC controls, based on the control information received from the master crossbar controller, the egress crossbar to interconnect input cross-point EI-1 with output cross-point EO-2 to forward "Data Segment (1)" from the center stage crossbar of the first fabric card to the port controller and to interconnect input cross-point EI-2 with output cross-point EO-2 to forward "Data Segment (2)" from the center stage crossbar of the second fabric card to the port controller. Assume further that the crossbar controller of the sending LCC controls, based on the control information received from the master crossbar controller, the port controller to combine "Data Segment (1)" and "Data Segment (2)" into "Packet" and provide "Packet" to a port P-2 of the receiving LCC. A receiver (e.g., a network device 210), connected to port P-2, may thus receive "Packet."

In this way, a multi-chassis network switch may be implemented to forward data from one device to another through independent center stage devices.

As indicated above, FIGS. 4A-4G are provided merely as examples. Other examples are possible and may differ from what was described with regard to FIGS. 4A-4G.

FIGS. 5A-5D are diagrams of example implementations 500-530 relating to example process 300 shown in FIG. 3. FIGS. 5A-5D show examples of forwarding data using a multi-chassis network switch having one or more independent modular center stage devices.

Figure 5A:
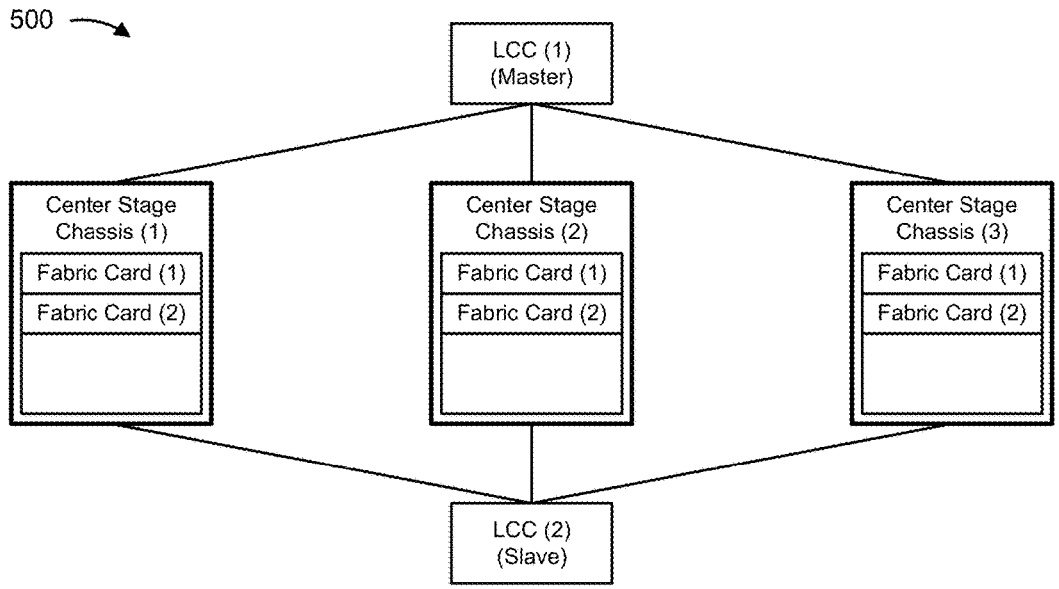
FIGS. 5A-5D are diagrams of example implementations relating to the example process shown in FIG. 3.

As shown in FIG. 5A, assume, for example implementation 500, that a multi-chassis switch (e.g., switch 200) includes first and second LCC (e.g., outer stage devices 220) as well as first, second, and third center stage chassis (e.g., center stage devices 230). Assume further that each LCC includes ingress and egress crossbars (e.g., an outer stage crossbar 226) and a crossbar controller (e.g., crossbar controller 228), and each center stage chassis includes a pair of fabric cards, each having a center stage crossbar (e.g., center stage crossbar 232) and a crossbar controller (e.g., crossbar controller 234). Input and output cross-points of each LCC's ingress and egress crossbars are connected (e.g., via links 240) to corresponding output and input cross-points of each fabric cards' center stage crossbars. Likewise, the crossbar controllers of the switch are connected to the first LCC's crossbar controller, which serves as the master crossbar controller of the switch. Thus, the first LCC's crossbar controller may control the switch's other crossbar controllers to forward data between devices connected to the ports of the first and second LCC through the fabric cards' center stage crossbars.

Figure 5B:
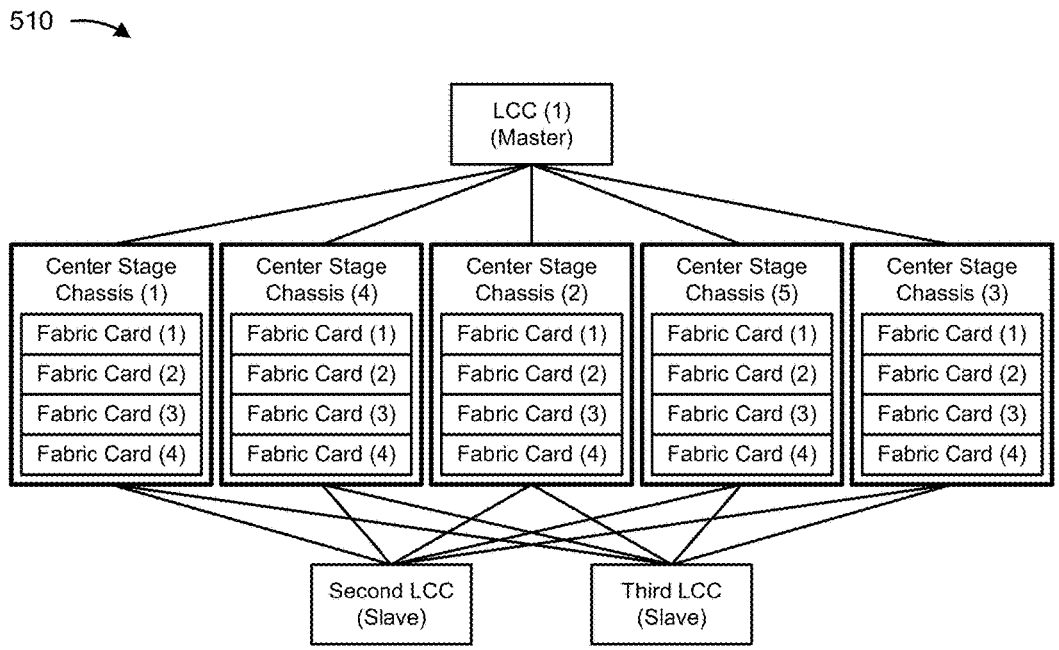

As shown in FIG. 5B, assume, for example implementation 510, that a network operator adds, to the switch of example implementation 500, a third LCC (e.g., another outer stage device 220). Assume further that the network operator adds two additional stage chassis, each containing four fabric cards, and installs third and fourth fabric cards into each of the other center stage chassis. Assume further that the network operator makes additional connections (e.g., via links 240) between the devices of the switch such that input and output cross-points of each LCC's ingress and egress crossbars are connected to corresponding output and input cross-points of each fabric cards' center stage crossbars. Likewise, the network operator connects the crossbar controllers, of the additional LCC and fabric cards, to the first LCC's crossbar controller, which serves as the master crossbar controller of the switch. In this way, the network operator may upgrade the switch by adding outer stage devices, by adding center stage devices, and/or by providing additional center stage crossbars (and associated controllers) to existing center stage devices.

Figure 5C:
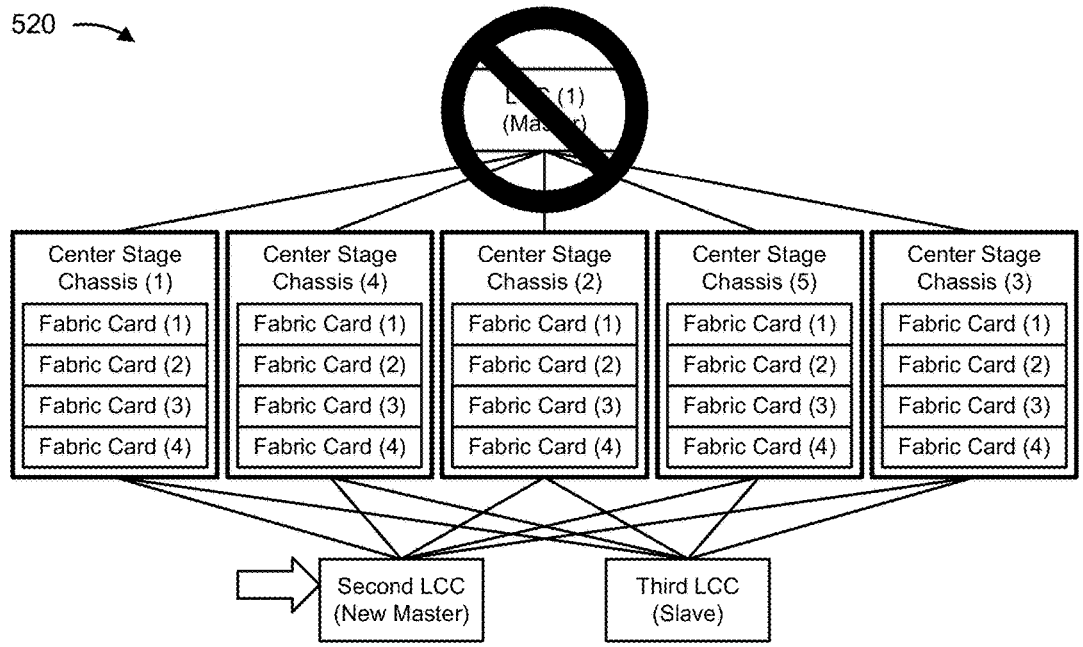

As shown in FIG. 5C, assume, for example implementation 520, that the first LCC of example implementation 510 experiences a failure, is taken offline, or is otherwise rendered unusable. One or more of the remaining crossbar controllers may detect the failure (e.g., by receiving control information indicating that the first LCC has become unusable and/or by failing to receive control information indicating that the first LCC remains usable) and may select the crossbar controller of another LCC (e.g., the second LCC) to become the master crossbar controller (e.g., by an election, ranking, and/or manual selection process). In this way, the switch may continue operating despite the failure of a master crossbar controller and limit network interruptions associated with a particular offline outer stage device to only devices connected to ports of the particular offline outer stage device.

Figure 5D:
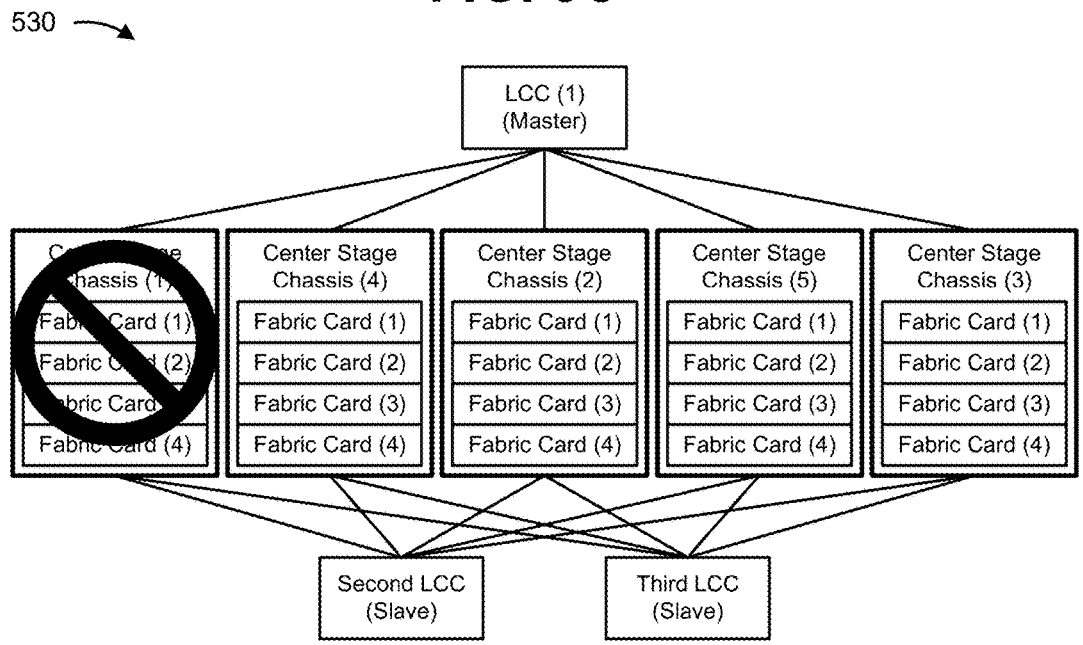

As shown in FIG. 5D, assume, for example implementation 530, that the first center stage chassis, and the fabric cards therein, of example implementation 510 experiences a failure, is taken offline, or is otherwise rendered unusable. The master crossbar controller of the first LCC may detect the failure (e.g., by receiving control information indicating that the first center stage chassis has become unusable and/or by failing to receive control information indicating that the first center stage chassis remains usable). Likewise, the master controller may provide control information to the other LCC crossbar controllers directing the ingress and egress crossbars of the LCC to forward data through the remaining fabric cards of the remaining center stage chassis. In this way, the switch may continue operating, without network downtime, despite the loss of one or more center stage crossbars and/or center stage devices.

As indicated above, FIGS. 5A-5D are provided merely as examples. Other examples are possible and may differ from what was described with regard to FIGS. 5A-5D.

Implementations described herein may assist a network operator in operating a multi-chassis switch by using one or more modular center stage chassis configured to meet physical and/or operational requirements. Independently operated modular center stage chassis may further assist the network operator in implementing and scaling the multi-chassis switch while enabling the switch to continue operating despite a failure of one or more components.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

As used herein, a packet may refer to a network packet, a frame, a datagram, a segment, a fragment of a packet, a fragment of a frame, a fragment of a datagram, a fragment of a segment, or any other formatted or unformatted unit of data capable of being transmitted via a network.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A system, comprising:
   a first switching component, installed in a first chassis, to receive data from a sending device,
      the data being intended for a receiving device;
   a first controller, installed in the first chassis, to:
      obtain first control information associated with forwarding the data,
      identify, based on the first control information, a second switching component and a third switching component,
         the second switching component being installed in a second chassis, and
         the third switching component being installed in a third chassis, and
      control the first switching component to provide a first portion of the data to the second switching component and a second portion of the data to the third switching component;
   a second controller, separate from the first controller, to:
      obtain, from a master controller, second control information associated with forwarding the data,
      identify, based on the second control information, a fourth switching component connected to the receiving device,
         the fourth switching component not being installed in the second chassis or the third chassis, and
      control, based on the second control information, the second switching component to forward the first portion of the data to the fourth switching component; and
   a third controller, separate from the first controller and the second controller, to:
      obtain, from the master controller, third control information associated with forwarding the data,
      identify, based on the third control information, the fourth switching component, and
      control, based on the third control information, the third switching component to forward the second portion of the data to the fourth switching component.

2. The system of claim 1, further comprising:
   a fourth controller, separate from the first controller, the second controller, and the third controller, to:
      control the fourth switching component to provide the first portion of the data and the second portion of the data to the receiving device,
         the fourth controller being installed in a fourth chassis.

3. The system of claim 2, where the first controller is the master controller, and
   the first controller is further to:
      provide, to the fourth controller, fourth control information identifying a connection between the first switching component and the sending device.

4. The system of claim 2, where the fourth controller is the master controller,
   the first controller is further to:
      provide, to the fourth controller, fourth control information based on receiving the data from the sending device; and
   the fourth controller is further to:
      provide the second control information, to the second controller, based on receiving the fourth control information, and
      provide the third control information, to the third controller, based on receiving the fourth control information.

5. The system of claim 2, where:
   the second switching component connects, via a first group of links between the second chassis and each of the first chassis and the fourth chassis, to the first switching component and to the fourth switching component; and
   the third switching component connects, via a second group of links between the third chassis and each of the first chassis and the fourth chassis, to the first switching component and to the fourth switching component,
      the second group of links being separate from the first group of links.

6. The system of claim 1, where the master controller connects, via control links, to the first controller, the second controller, and the third controller,
   the second controller not being connected, via the control links, to the third controller.

7. The system of claim 1, where each of the second switching component and the third switching component is a crossbar switch.

8. A method, comprising:
   receiving, by a first switching component of a first chassis, data from a sending device, the data being intended for a receiving device;
   obtaining, by a first controller of the first chassis, first control information associated with forwarding the data;
   identifying, by the first controller and based on the first control information, a second switching component and a third switching component,
      the second switching component being installed in a second chassis, and
      the third switching component being installed in a third chassis;
   controlling, by the first controller, the first switching component to provide a first portion of the data to the second switching component and a second portion of the data to the third switching component;
   obtaining, by a second controller and from a master controller, second control information associated with forwarding the data,
      the second controller being separate from the first controller,
   identifying, by the second controller and based on the second control information, a fourth switching component connected to the receiving device,
      the fourth switching component not being installed in the second chassis or the third chassis;
   controlling, by the second controller and based on the second control information, the second switching component to forward the first portion of the data to the fourth switching component;

obtaining, by a third controller and from the master controller, third control information associated with forwarding the data,
the third controller being separate from the first controller and the second controller;
identifying, by the third controller and based on the third control information, the fourth switching component; and
controlling, by the third controller and based on the third control information, the third switching component to forward the second portion of the data to the fourth switching component.

9. The method of claim 8, further comprising:
controlling, by a fourth controller, the fourth switching component to provide the first portion of the data and the second portion of the data to the receiving device,
the fourth controller being installed in a fourth chassis, and
the fourth controller being separate from the first controller, the second controller, and the third controller.

10. The method of claim 9, where the first controller is the master controller, and
the method further comprises:
providing, by the first controller and to the fourth controller, fourth control information identifying a connection between the first switching component and the sending device.

11. The method of claim 9, where the fourth controller is the master controller, and
the method further comprises:
providing, by the first controller and to the fourth controller, fourth control information based on receiving the data from the sending device;
providing, by the fourth controller, the second control information to the second controller, based on receiving the fourth control information; and
providing, by the fourth controller, the third control information to the third controller, based on receiving the fourth control information.

12. The method of claim 9, where:
the second switching component connects, via a first group of links between the second chassis and each of the first chassis and the fourth chassis, to the first switching component and to the fourth switching component; and
the third switching component connects, via a second group of links between the third chassis and each of the first chassis and the fourth chassis, to the first switching component and to the fourth switching component,
the second group of links being separate from the first group of links.

13. The method of claim 8, where the master controller connects, via control links, to the first controller, the second controller, and the third controller,
the second controller not being connected, via the control links, to the third controller.

14. The method of claim 8, where each of the second switching component and the third switching component is a crossbar switch.

15. A system, comprising:
a first chassis;
a second chassis; and
a third chassis,
the first chassis comprising:
a first switching component to receive data from a sending device,
the data being intended for a receiving device;
a first controller to:
obtain first control information associated with forwarding the data,
identify, based on the first control information, a second switching component and a third switching component,
the second switching component being installed in the second chassis, and
the third switching component being installed in the third chassis, and
control the first switching component to provide a first portion of the data to the second switching component and a second portion of the data to the third switching component;
a second controller, separate from the first controller, to:
obtain, from a master controller, second control information associated with forwarding the data,
identify, based on the second control information, a fourth switching component connected to the receiving device, and
control, based on the second control information, the second switching component to forward the first portion of the data to the fourth switching component; and
a third controller, separate from the first controller and the second controller, to:
obtain, from the master controller, third control information associated with forwarding the data,
identify, based on the third control information, the fourth switching component, and
control, based on the third control information, the third switching component to forward the second portion of the data to the fourth switching component.

16. The system of claim 15, where the first chassis further comprises:
a fourth controller, separate from the first controller, the second controller, and the third controller, to:
control the fourth switching component to provide the first portion of the data and the second portion of the data to the receiving device.

17. The system of claim 16, where the first controller is the master controller, and
the first controller is further to:
provide, to the fourth controller, fourth control information identifying a connection between the first switching component and the sending device.

18. The system of claim 16, where the fourth controller is the master controller,
the first controller is further to:
provide, to the fourth controller, fourth control information based on receiving the data from the sending device; and
the fourth controller is further to:
provide the second control information, to the second controller, based on receiving the fourth control information, and
provide the third control information, to the third controller, based on receiving the fourth control information.

19. The system of claim 16, where:
the second switching component connects, via a first group of links between the second chassis and each of the first chassis and a fourth chassis, to the first switching component and to the fourth switching component; and the third switching component connects, via a second group of links between the third chassis and each of the first chassis and the fourth chassis, to the first switching component and to the fourth switching component, the second group of links being separate from the first group of links.

20. The system of claim 15, where the master controller connects, via control links, to the first controller, the second controller, and the third controller, the second controller not being connected, via the control links, to the third controller.

* * * * *